United States Patent [19]

Mullins

[11] 4,274,824

[45] Jun. 23, 1981

[54] MOLD BOX APPARATUS

[76] Inventor: Wayne L. Mullins, 5001 E. Cactus, Scottsdale, Ariz. 85254

[21] Appl. No.: 139,096

[22] Filed: Apr. 10, 1980

Related U.S. Application Data

[63] Continuation-in-part of Ser. No. 947,590, Oct. 2, 1978, Pat. No. 4,218,206.

[51] Int. Cl.[3] .................................................. A21C 3/00

[52] U.S. Cl. .................................... 425/253; 425/359; 425/413; 425/414; 425/452

[58] Field of Search ............... 425/253, 359, 413, 414, 425/452

[56] References Cited

U.S. PATENT DOCUMENTS

| | | | |
|---|---|---|---|
| 3,128,523 | 4/1964 | Benjey et al. | 425/413 |
| 3,669,402 | 6/1972 | Paulson | 425/413 |

*Primary Examiner*—Donald E. Czaja
*Assistant Examiner*—James R. Hall
*Attorney, Agent, or Firm*—Herbert E. Haynes, Jr.

[57] ABSTRACT

A mold box apparatus for casting cementitious building blocks having special channels formed in the sidewalls thereof in which thermally insulative foam is castable.

11 Claims, 11 Drawing Figures

MOLD BOX APPARATUS

CROSS REFERENCE TO RELATED APPLICATION

This applicaton is a continuation-in-part of U.S. patent application Ser. No. 947,590, filed by the same inventor on Oct. 2, 1978 now U.S. Pat. No. 4,218,206.

BACKGROUND OF THE INVENTION

1. Field of the Invention

This invention relates to an apparatus for fabrication of cementitious building blocks, and more particulary to an apparatus for casting cementitious building blocks with special channels therein for containment of thermally insulative material.

2. Description of the Prior Art

As a result of the current interest in energy conservation, the well known cementitious building block, which has been used for many years in the construction arts, has become the subject of much criticism due to its lack of thermally insulative properties, and this has resulted in many attempts to improve the heat transfer characteristics of such blocks.

One prior art technique employed to improve the heat transfer characteristics of cementitious blocks includes the filling of the vertical passages formed through the block with insulative material. This does improve the heat transfer characteristics of the block somewhat, but the benefit derived is limited in that the end walls and center rib wall of each block remains uninsulated and thus, a finished wall built of these blocks has a multiplicity of uninsulated cementitious thermally conductive passages extending transversely therethrough. While this technique does improve the thermal energy characteristics somewhat, it causes further problems in that the vertical passages of the blocks, which are often used as passageways for plumbing, wiring, wall reinforcing bars, cementitious grouting and the like, can no longer be so used due to the presence of the insulative material, which if omitted from selected passageways will reduce the thermally insulative properties of the finished block wall.

Another prior art attempt at improving the thermally insulative characteristics of cementitious blocks includes the casting of inwardly facing notches in the end walls and center rib wall of otherwise conventionally configured blocks. Two prefabricated, rigid planar members of insulative material are manually inserted into the blocks so as to be held in place by the special notches. This locates the inserted members so that each spans a different one of the vertical passages of the blocks. This prior art attempt at improving the insulative properties of cementitious blocks has the same shortcomings as the previously described technique of filling the verticl passages with insulative material in that the block's end walls and center rib wall remain good conductors of thermal energy and the vertical passages are at least partially blocked.

Continuing attempts to provide cementitious blocks with substantially improved thermally insulative properties progressed from the above described prior art techniques to cementitious blocks which are cast in various special configurations for containing insulative barriers that are in turn cast in place within the special blocks. In general, these special blocks are cast with a channel extending through the block. The channel, which may be centrally located or offset toward one of the vertical sidewalls of the block, are parallel to the sidewalls of the block and are of substantially equal size with respect thereto. When the block is fully cured, insulative foam is cast within the channel so as to become an integral part of the block. In theory this is ideal in that the insulative foam barrier extends the full length and height of the block thus retarding heat transfer between the opposite vertical sidewalls or faces, of the block. However, in actual practice this technique causes some problems with the production of the blocks themselves and further problems with the casting of the insulative foam in the special blocks.

With regard to the casting of the special blocks, it will be appreciated that they cannot be cast without some means for interconnection of the block parts which are separated by the channel which will subsequently contain the insulative foam barrier. In the absence of interconnecting structure or structures, the separated block parts will simply be free to move relative to each other. In this situation the desired shape of the block will be difficult if not impossible, to maintain during casting, transporting, and curing of the block itself, and would need special positioning and supporting structures when the insulative foam is being cast in the channel.

In view of this need for block part interconnection, one prior art special cementitous block was cast with a U-shaped channel formed in at least one of its vertical sidwalls so that interconnection was provided by the closed bottom which defined the channel. This configuration was quickly discarded in that the lack of support at the upper ends of the U-shaped channel resulted in sagging of the block parts.

Another prior art special block was provided with a spaced pair of relatively thick structural interconnecting walls which were equally spaced along the length of the channel and extended from the open bottom of the channel to a point about half way to the top of the channel. To provide sufficient interconnecting support of this particular prior art block, the two interconnecting structural walls were relatively thick and thus, the resulting block was provided with two large cementitious passageways which were good conductors of thermal energy.

As hereinbefore mentioned, the prior art special blocks which were cast with the channels therein also presented problems with regard to the casting of insulative foam therein. As is known, some insulative foams, such as polystyrene, have little or not adhesive properties, i.e., they will not adhere to the cementitious surfaces. Thus, such foams will add little or no structural strength to the interconnected parts of the block which define the channel and therefore the interconnection members must be either increased in number or size, and such increases defeat the objective of improving the thermal insulative properties of the block.

A particular insulative foam, namely, polyurethane foam is well known to be an excellent insulator and is a highly tenacious material in that it will form a very strong bond when cast and cured in contact with virtually anything. Polyurethane foam is the ideal material for use in the especially cast blocks in that it will add considerable structural strength to the special blocks and thus allow the use of a minimum number and minimum size of the interconnecting members. This tenacious characteristic of polyurethane foam however, causes production problems when cast in the channels of the above described prior art special cementitious blocks. The open ends, and in some instances, the open or at least partially open, bottoms of the channels cast in the prior art special blocks must be temporarily closed during the casting of the polyurethane foam within the channels. The polyurethane foam will form a strong bond with the channel closing members just as it does with the block surfaces, and thus without the application of some sort of a releasing agent, the channel closing members are very difficult, if not impossible, to remove without destroying the product or the channel closing members. The use of a releasing agent is costly, time consuming, and not entirely satisfactory. The channel closing members must be recoated with the releasing agent prior to each use, and even with such recoating, production must be interrupted periodically to grind off the polyurethane foam which invariably adheres to the channel closing members at locations of inadequate application of the releasing agent.

Further, in production operations, complex and costly equipment is needed to position the channel closing members and firmly hold them in place against the pressures exerted by the curing polyurethane foam. And, the channel closing members must tightly close the otherwise open channels in that the curing polyurethane foam will escape through any cracks, gaps or other openings and stick to anything it comes in contact with. It is virtually impossible to completely close the sides and bottom of the block's channel due to manufacturing tolerances. For example, the channel closing members may completely close the channel of one block, and be a loose fit in the channel of subsequent blocks.

The above described shortcomings and problems which have been encountered in the prior art attempts to produce a thermally efficient cementitious block have been overcome, to a great extent, in a particular block which is fully disclosed in U.S. patent application Ser. No. 109,520, filed on Jan. 4, 1980 by the same inventor. Briefly, this special block includes a cementitious block of substantially conventional configuration which is cast with an open top channel in at least one of its vertical sidewalls or faces. The bottom of the channel is closed by a thin-wall web or skin, and the opposite end of the channel are similarly closed. Thin-wall stabilizer webs are also provided in spaced increments between the block parts which are separated from each other by the channel. The thin-wall webs provide the needed interconnection of the separated block parts, and the bottom and end closing thin-wall webs or skins, allows polyurethane foam to be cast within the block's channels, thus eliminating the need for external channel closing members.

To the best of my knowledge, none of the above described prior art special blocks have achieved any appreciable amount of commercial success in that the above described production problems associated with casting of the blocks per se, and subsequent in-block casting of the insulative foam panels have kept these prior art blocks from being economically mass produced. Since the prior art blocks have not solved the inherent production problems, it is believed that no sophisticated production equipment has been developed or suggested, and it is further believed that such equipment has not been developed or suggested for the production of the specific special block disclosed in the hereinbefore referenced U.S. patent application Ser. No. 109,520, filed on Jan. 4, 1980.

SUMMARY OF THE INVENTION

In accordance with the present invention, a new and useful mold box apparatus is disclosed for economic mass production of the specific cementitious block disclosed in the hereinbefore referenced U.S. patent application, and which, with minor modifications, can be employed in the production of similar cementitious blocks. The mold box apparatus includes a pallet die, a mold box die and a head die assembly which are used in conjunction with well known conventional block making machines. The block making machine, among other things, sequentially moves the pallet to a position below the mold box die, fills the voids in the mold box die with cement and reciprocally moves the head die assembly into the mold box die atop the cement.

The mold box die is provided with the usual core die assembly which forms the vertical passages through the cementitious block, and is provided with at least one channel die assembly which forms the insulative foam receiving channel in the sidewall of the cementitious block. The channel die assembly is mounted on the mold box die so as to span the open top thereof, and is provided with a plurality of especially configured and especially arranged channel dies which depend into the compartment defined by the mold box die. Each of the plurality of channel dies of the channel die assembly have their depending ends spaced upwardly from the bottom of the mold box die so that when cement is poured into the mold box die, it will flow into that space and thereby provide the bottom closing thin-wall web of the channel of the cementitious block. The plurality of channel dies of the channel die assembly are spaced from each other and spaced from the sides of the mold box die so that when cement is poured into the mold box die it will flow into those spaces and thereby provide the finished cementitious block with thin-wall webs which close the opposite ends of the channel and form spaced thin-wall webs which stabilizingly interconnect the parts of the block which are separated by the channel.

The special configuration and spaced arrangement of the individual channel dies of the channel die assembly provide the mold box assembly of the present invention with the capability of forming a cementitious block with a channel within at least one of its sidewalls with this special cementitious block being capable of supporting itself during its curing process. Further, the special channel formed in the cementitious block is in and of itself a mold in which polyurethane foam may be subsequently cast without requiring the use of any removable channel closing structures during the foam casting process.

As mentioned above, the mold box apparatus of the present invention also includes the usual core die assembly which forms the vertical passages through the cementitious blocks cast therein. The cores of this core die assembly may be especially configured so that in conjunction with a special pallet die, the mold box assembly becomes a self-aligning structure which casts special mortarless interlocking cementitious blocks of the type fully disclosed in U.S. Pat. No. 4,186,540 issued on Feb. 5, 1980 to the same inventor. And this interlocking block may be cast to include the hereinbefore described special insulative foam containing channel.

The mold box die is provided with reversible and/or replaceable wear plates to facilitate maintaining of the apparatus within specific tolerances.

Accordingly, it is an object of the present invention to provide a new and improved apparatus for fabrication of cementitious building blocks which are adapted to subsequently receive at least one thermally insulative barrier.

Another object of the present invention is to provide a new and improved apparatus for fabrication of thermally insulatable cementitious building blocks, with the apparatus being adapted for use on conventional block making machines.

Another object of the present invention is to provide a new and improved mold box apparatus for casting a cementitious block having a channel within at least one of the sidewalls of the block in which thermally insulative foam is subsequently cast.

Another object of the present invention is to provide a new and improved mold box apparatus of the above described character wherein the parts separated by the channel of the cementitious block cast therein are interconnected by thin-wall webs so that the block is self-supporting during curing thereof.

Another object of the present invention is to provide a new and improved mold box apparatus of the above described type wherein the channel of the cementitious block cast therein is formed with a thin-wall bottom closing web and thin-wall end closing webs so that the channel forms a mold in which polyurethane foam may be subsequently cast.

Still another object of the present invention is to provide a mold box apparatus of the above described character which may be modified for casting mortarless interconnecting cementitious blocks having the above described insulative foam receiving channels simultaneously cast therein.

The foregoing and other objects of the present invention, as well as the invention itself, may be more fully understood from the following description when read in conjunction with the accompanying drawings.

DESCRIPTION OF THE PREFERRED EMBODIMENTS

Figure 1:
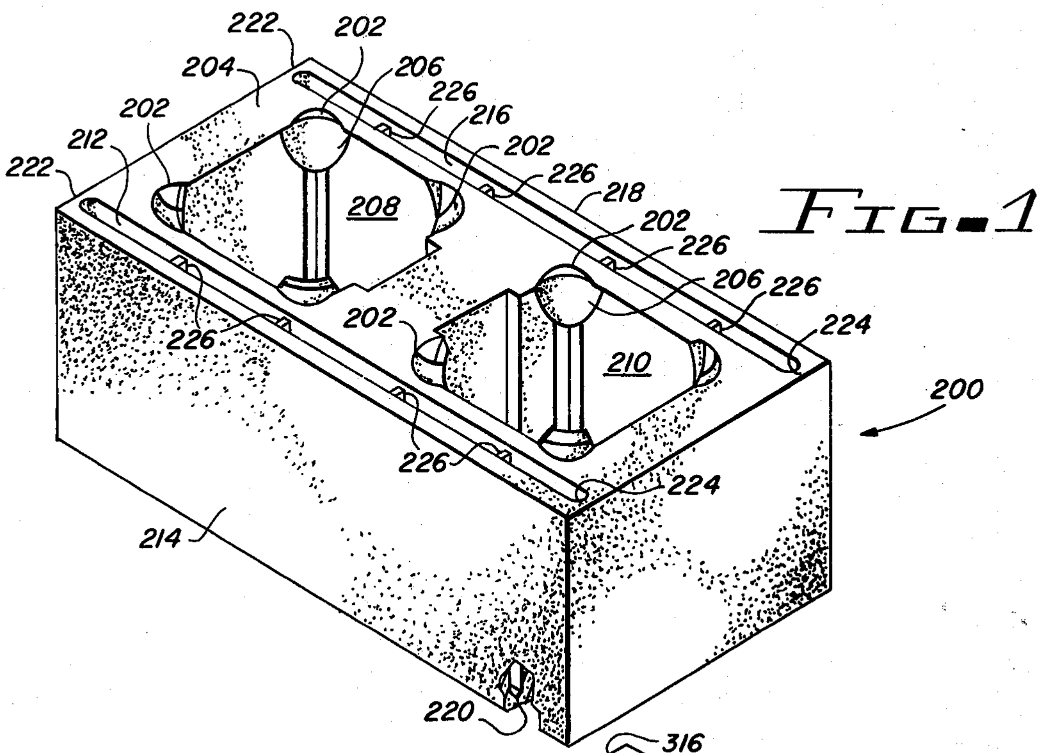
FIG. 1 is a perspective view showing one of the cementitious building blocks castable in the mold box apparatus of the present invention.
Figure 3:
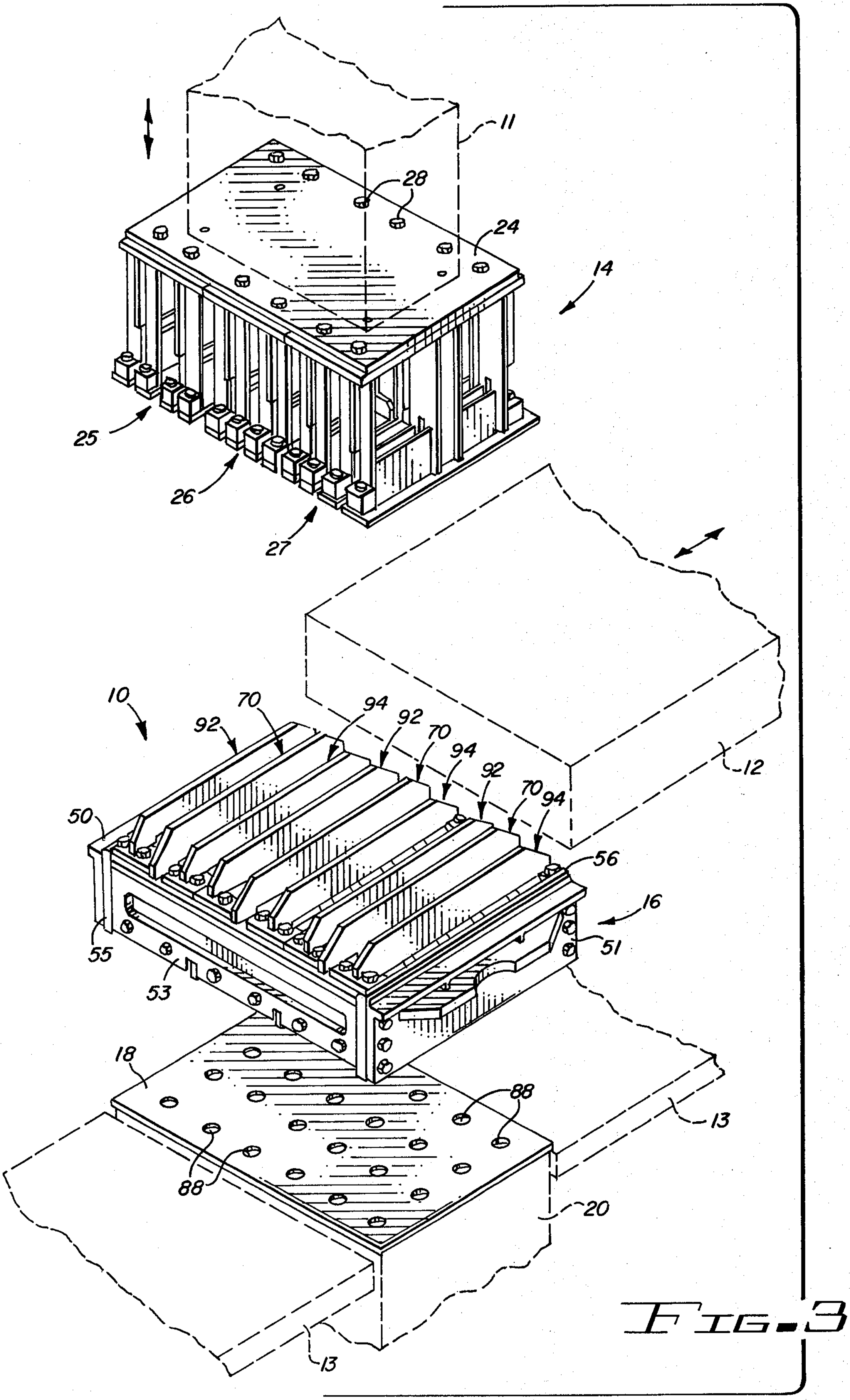
FIG. 3 is an isometric view illustrating the pallet die, mold box die, and head die assembly which form the mold box apparatus of the present invention, with those elements shown in their relative positions with respect to each other and with respect to a phantom fragmentary illustration of a block making machine.

Referring more particularly to the drawings, FIG. 3 illustrates an apparatus, which is indicated generally by the reference numeral 10, for forming a mortarless interconnecting thermally insulatable cementitious block of the type shown in FIG. 1 and which is indicated therein generally by the reference numeral 200.

The cementitious block 200 is of special configuration which includes eight (8) semi-frustoconical male projections 202 which extend from one horizontal surface 204 thereof and are supported on corner corbels 206 which are cast in each corner of the vertical passages 208 and 210 formed through the block. The block 200 is provided with eight (8) open corners (not shown) at the bottom ends of the passages 208 and 210, with those corner openings being in vertical alignment with the male projections 202 cast on the opposite surface of the block. The above described special configuration of the block 200 provides it with the capability of being interlockingly assembled to other similar blocks without the need for cementitious mortar to erect a precision aligned block wall, all as is fully described in the hereinbefore referenced U.S. Pat. No. 4,186,540. In addition to this special block alignment and interlocking configuration, the block 200 is seen to also include an open top channel 212 within the vertical sidewall or face 214 thereof and an identical channel 216 within the opposite sidewall or face 218 thereof. As shown, the channels 212 and 216 are open at their top ends, are closed with a thin-wall bottom closing web 220 and have their opposite ends closed with thin-wall webs, or skins, 222 and 224. The channels 212 and 216 are closed at their bottoms and opposite ends so that polyurethane foam (not shown) may be poured and cast therein. Further, a plurality of incrementally spaced thin-wall webs 226 are formed transversely in the channels 212 and 216 which, in conjunction with the webs 220, 222 and 224 provide stability to the block 200 so that it is self-supporting during curing thereof. This special interlocking thermally insulatable cementitious block 200 is cast in the apparatus 10 as will now be described.

The apparatus 10 is mounted on and operated in conjunction with a conventional block making machine which is shown in fragmentary phantom lines to include a vertical reciprocating device 11, a horizontal reciprocating cement delivery mechanism 12 and a pallet moving conveyor 13. As will hereinafter be described in detail, the apparatus 10 includes the combination of a head die assembly 14 mounted on the vertical reciprocating device 11, a mold box die 16 suitably held in a fixed position such as upon the block making machine with such affixation not being shown, and a combination pallet die 18 carried on the conveyor 13, and a suitable pallet elevating device 20.

For completeness of this description, a brief and general description of the commonly employed block making process will now be given. The pallet conveyor brings the pallet into position beneath the mold box and a suitable elevating device raises the pallet to close the otherwise open bottom of the mold box. The cement delivery mechanism is then moved into position above the mold box and cement is deposited into the cavities of the mold box. The delivery mechanism is then retracted and the head assembly is moved downwardly into the mold box atop the cement therein. The lowered head die assembly exerts a vibrating and compacting force on the cement to mold the cement into the configuration dictated jointly by the pallet, mold box, and head assembly. When the compacting is complete, the head assembly is raised and the pallet lowered, whereupon, the pallet having the molded or cast blocks thereon is moved by the conveyor to a kiln (not shown) for curing. The cycle is then repeated with all of the various steps and operations being automatic.

It should be noted that the above brief description of the block making process is well known in the art, and that the basic process may be carried out by various well known block making machines.

The apparatus 10 is shown as being configured to simultaneously cast three full blocks per machine cycle, however, the apparatus may be configured to produce more or less blocks per cycle as desired, and in accordance with the capabilities of the block making machine to which the apparatus 10 is attached.

Figure 4:
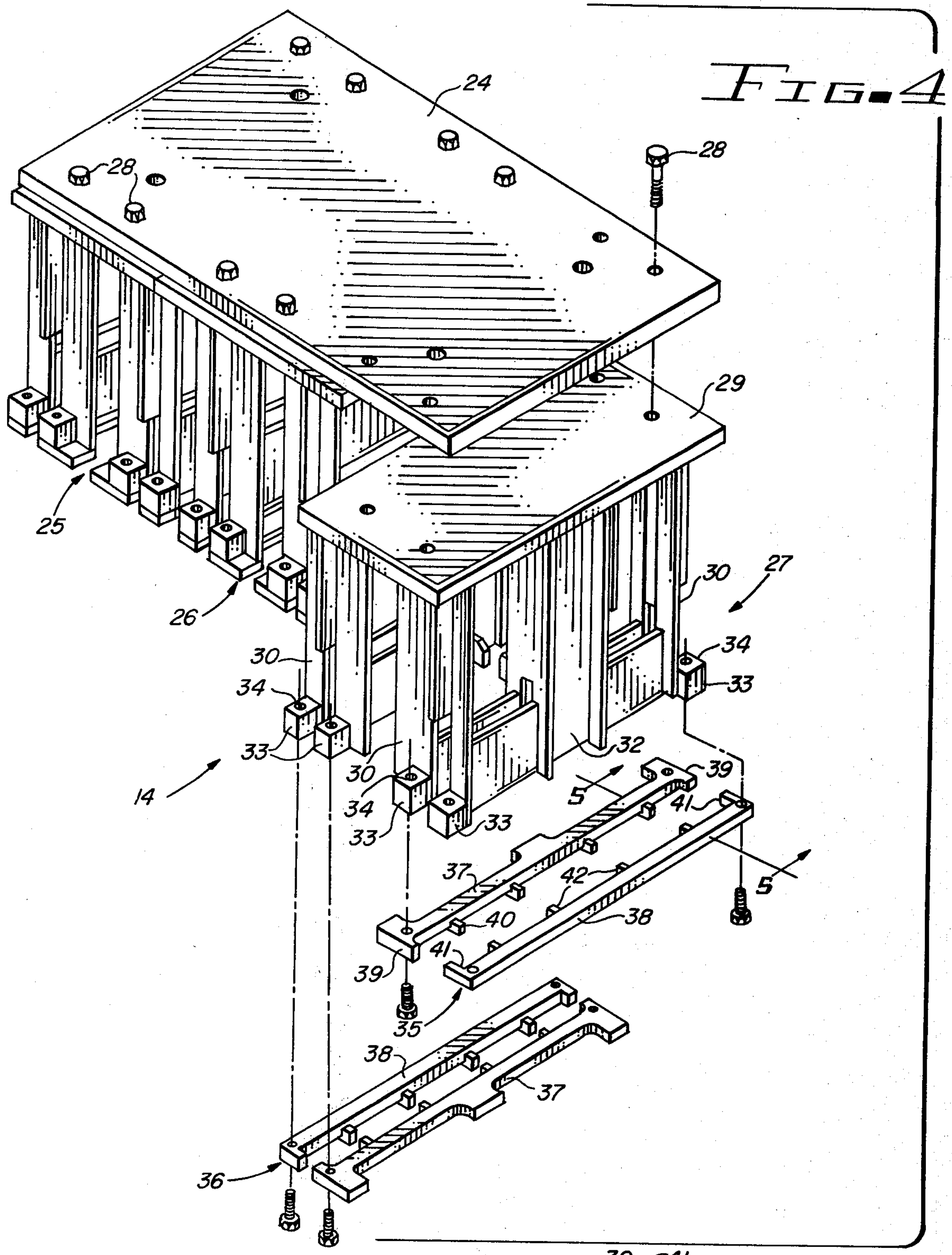
FIG. 4 is an isometric view of a multi-block forming head die assembly having one of the head dies exploded therefrom to show the elements and various features thereof.

As seen best in FIG. 4, the head die assembly 14 includes a flat plate 24 which is suitably attached to the vertical reciprocating device 11 of the block making machine (FIG. 3). The flat plate 24 has three identical head dies 25, 26 and 27 demountably attached thereto such as with bolts 28, so that the head dies depend from the plate 24.

Since the head dies 25, 26 and 27 are identical, it will be understood that the following detailed description of the head die 27 also applies to the head dies 25 and 26.

As shown, the head die 27 includes a flat mounting plate 29 of rectangular configuration having four corner columns 30 (three shown), each depending from a different one of the corners of the plate and each having two intermediate columns 32 (one shown), with a different one of the intermediate columns 32 depending from the midpoint of each of the longitudinal sides of the mounting plate 29. Corner columns 30 and the intermediate columns 32 are affixed at their respective locations on the mounting plate 29, each are suitably braced and each of the corner columns have a pair of mounting blocks 33, with a bore 34 formed therethrough, affixed to its opposite end. Therefore, it will be apparent that the head die 27 is provided with two of the mounting blocks 33 at each end of the longitudinal edges of the mounting plate 29 and disposed therebelow.

A pair of mirror image shoe die assemblies 35 and 36 are demountably attached to the mounting blocks 33 of the head die 27, such as with suitable bolts so that the shoe die assembly 35 is disposed below and parallel with respect to one longitudinal edge of the mounting plate 29 and the other shoe die assembly 36 is similarly disposed with respect to the other longitudinal edge of the mounting plate 29.

Since the shoe die assemblies 35 and 36 are mirror images of each other, the following description of the shoe die assembly 35 will be understood to also apply to the shoe die assembly 36.

Figure 5:
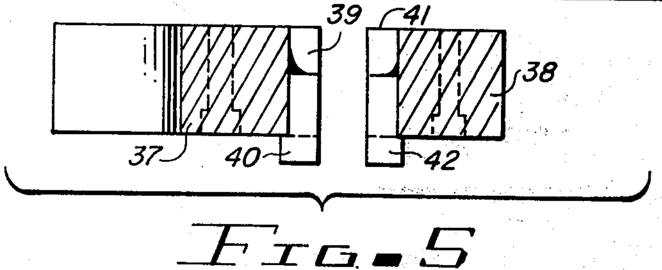
FIG. 5 is an enlarged sectional view taken on the line 5—5 of FIG. 4.

The shoe die assembly 35 is provided with an elongated inner shoe member 37 and an outwardly spaced elongated shoe member 38. The inner shoe member 37 is provided with an inwardly extending tab 39 on each of its opposite ends with a plurality of incrementally spaced intermediate tabs 40 which extend inwardly and depend downwardly from the shoe member 37 as seen best in FIG. 5. The outer shoe member 38 is similarly configured in that it is provided with an inwardly extending tab 41 on each of its opposite ends and has a plurality of incrementally spaced intermediate tabs 42 extending inwardly and depending downwardly therefrom.

The shoe die assemblies 35 and 36 are those portions of the head die assembly which are in physical contact with the cement during block casting operations and thus transfer the vibrating and compacting forces necessary for casting of the block, and produce the top horizontal flat surfaces of the blocks.

Figure 6:
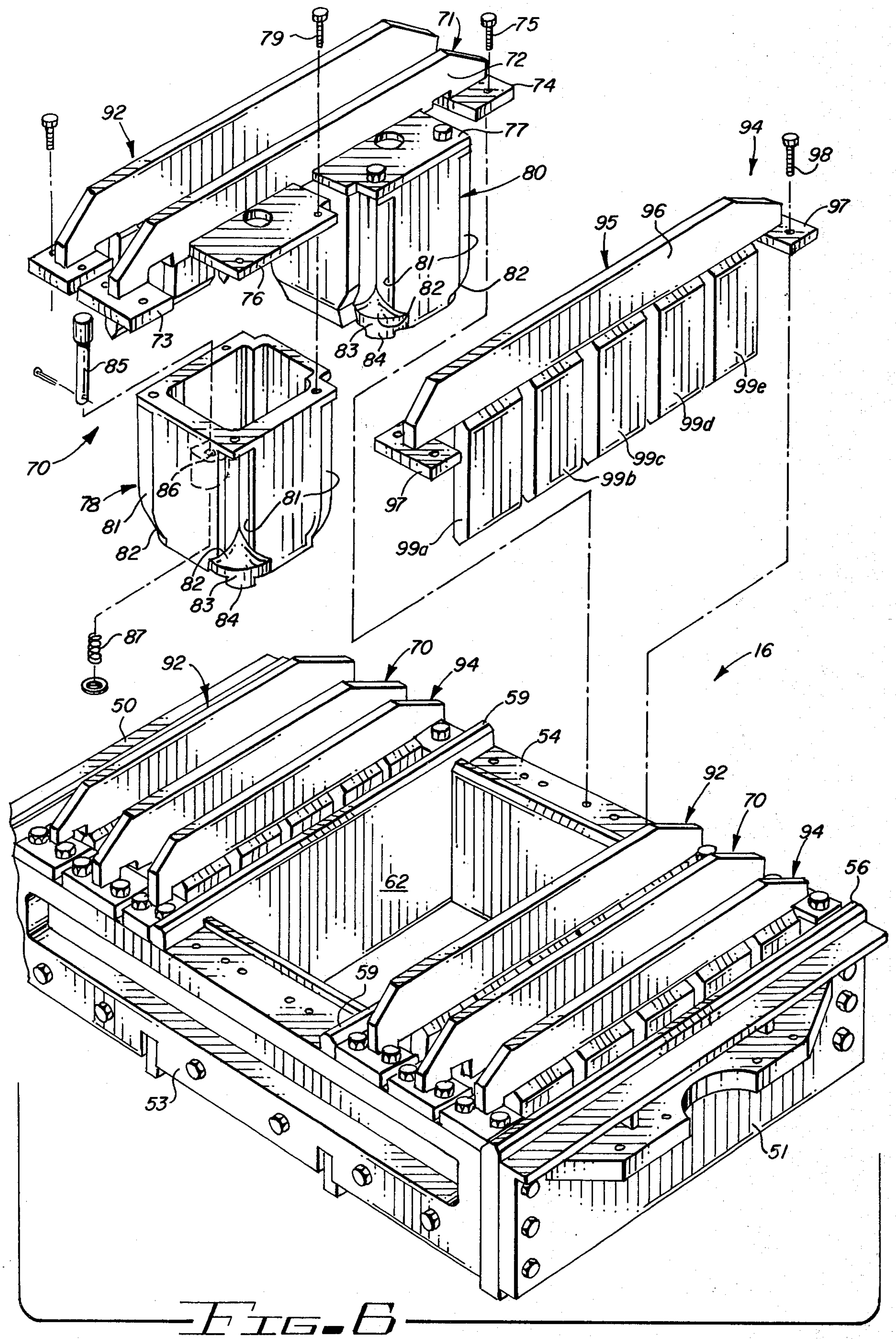
FIG. 6 is an isometric view of a multi-block forming mold box die with the block molding components exploded from one compartment thereof.
Figure 7:
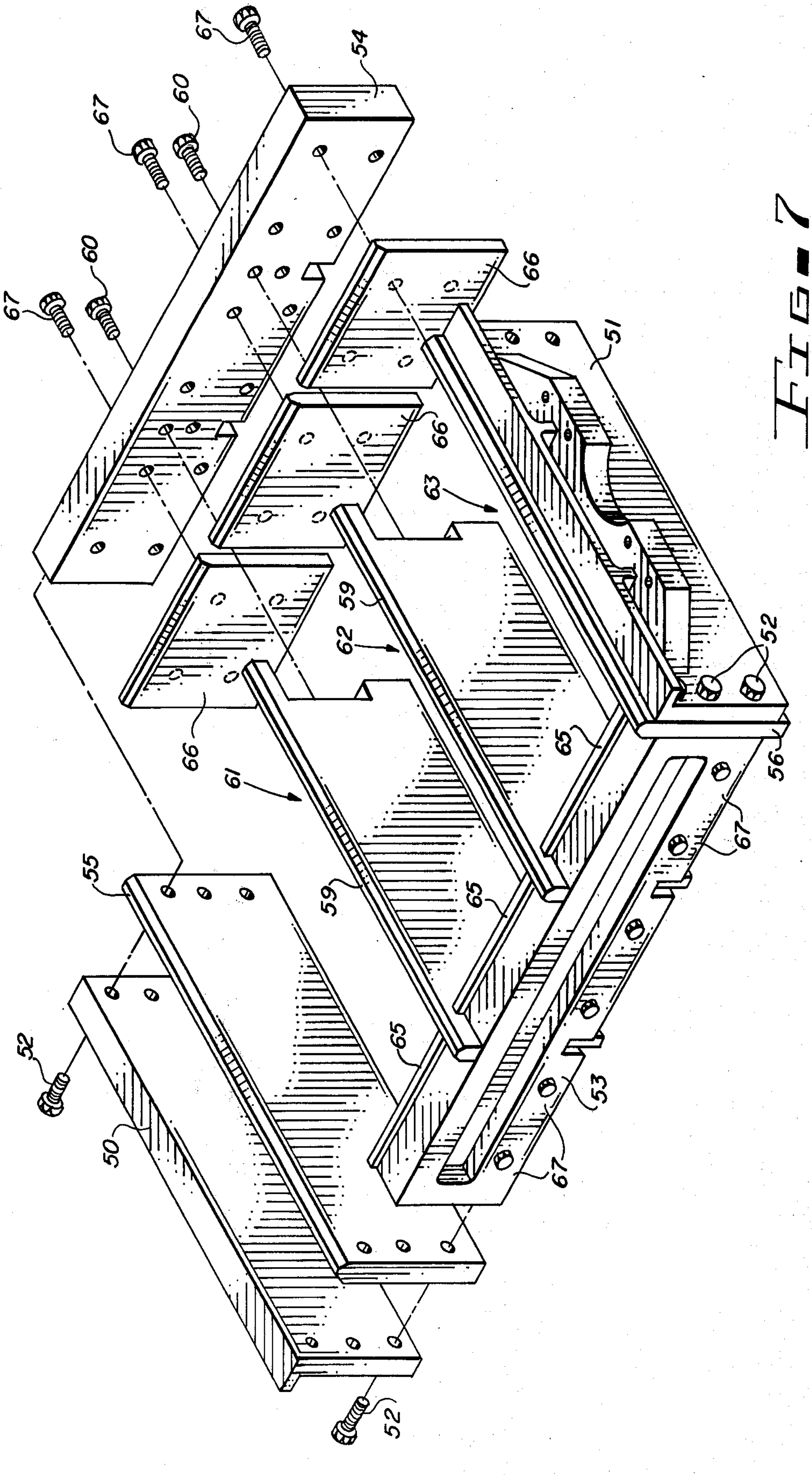
FIG. 7 is an isometric view of a multi-block forming mold box die structure with some of the elements of that mold box die structure being exploded to illustrate the various features thereof.

Reference is now made to FIGS. 3, 6 and 7 wherein the mold box die 16 is best seen. The mold box die 16 is shown as a three compartment structure for simultaneously casting three of the cementitious blocks 200 as hereinbefore described. It will be understood however, that the mold box die may be configured with more or less compartments as desired.

FIG. 7 shows the mold box die 16 as having opposite sidewalls 50 and 51 demountably coupled with suitable bolts 52 to end walls 53 and 54 so as to provide a frame like structure having an open bottom and an open top, and in a rectangular geometric configuration. A precision side wear plate 55 is interposed between the sidewall 50 and the end walls 53 and 54, and an identical side wear plate 56 is interposed between the sidewall 51 and end walls 53 and 54. The same bolts 52 which couple the sidewalls 50 and 51 to the end walls 53 and 54 also couple the side wear plates 55 and 56 in their respective interposed positions. Thus, both the sidewalls 50 and 51 and the side wear plates 55 and 56 are demountable. It will be further noted that the side wear plates 55 and 56 will not be exposed to the abrasiveness of cement at their extreme opposite ends, thus, when excessive wear occurs on the exposed surfaces, the side wear plates 55 and 56 may be simply reversed, thereby doubling their life.

A spaced pair of precision partition wear plates 59 are demountably secured transversely between the end walls 53 and 54 such as with bolts 60, and are spaced from the side wear plates 55 and 56 and spaced from each other so as to divide the mold box die into three equally sized compartments 61, 62 and 63. The demountable partition wear plates 59 may be easily replaced when excessive wear occurs on the opposite planar surfaces thereof by simply removing the bolts 60, installing new wear plates and reinserting the bolts.

Each of the equally sized compartments, 61, 62 and 63 of the mold box die assembly 16 are provided with opposite precision end wear plates 65 and 66 which are demountably attached to end walls 53 and 54, respectively, such as by bolts 67. Thus, the end wear plates 65 and 66 may be easily replaced when excessive wear occurs on the exposed surfaces thereof.

The mold box die 16 as described above, will determine the side and end surface configurations of the blocks cast therein, and core die assemblies 70 (FIG. 6) which are demountably attached to the mold box die 16, will determine the configuration of the passages formed through those blocks. Each of the core die assemblies 70 are identical, thus, the following description of the particular assembly 70 which is shown as being exploded from the compartment 62 of the mold box die in FIG. 6, will be understood to also apply to the other core assemblies.

The core die assembly 70 includes a hanger bracket 71 which consists of a spanner member 72 having a mounting flange 73 on one end and a similar mounting flange 74 on the opposite end thereof. Those mounting flanges 73 and 74 are adapted for demountable affixation on the opposite end walls 53 and 54, such as with bolts 75, thus positioning the spanner member 72 centrally over the compartment 62. The spanner member has a spaced pair of core mounting pads 76 and 77 affixed thereto, such as by welding, with the pad 76 having a core die 78 demountably attached thereto by bolts 79, and the pad 77 similarly having a core die 80 demountably secured thereto. The mounting pads 76 and 77 with their respective core dies 78 and 80 dependingly mounted thereon will determine the internal configuration of the passages 208 and 210 of the block 200 cast in the compartment 62 as hereinbefore mentioned. As seen, the pads 76 and 77 are substantially square, and the cores 78 and 80 are similarly shaped wit especially configured corners and depending ends as will hereinafter be described. Each corner of the cores 78 and 80 are formed with "L" shaped in cross section notches 81 which wrap around the corners and extend approximately three-quarters of the length of their respective cores 78 and 80, with the notches opening at their lower ends into inwardly flared enlarged cavities 82 each having an arcuate surface 83 at the extreme lower end thereof.

Therefore, with the cores 78 and 80 thus configured, the blocks 200 which are shown in FIG. 1 and fully described in the hereinbefore referenced U.S. Patent, are cast in the compartments 61, 62 and 63 of the mold box die 16 so as to have the pair of vertically disposed passages 208 and 210 formed therethrough with each passage having a relatively small "L" shaped in cross section columnar configuration cast in each corner thereof, which is formed by cement filling the notches 81, and will have the corner corbels 206 caused by cement filling the enlarged cavities 82. The cores 78 and 80 are each formed with four projections 84 (one shown in FIG. 6) which depend from the bottom surface of the cores, with each projection being located at a different corner of its respective one of the cores. As seen best in FIGS. 8 and 9, the projections 84 are in the shape of approximately one half of an inverted frustoconical configuration, i.e., a frustoconical projection which is vertically bisected. Thus, each of the projections 84 is formed with a vertical surface 90, which is flush with the arcuate surface 83 of its respective one of the enlarged cavities 82 formed in the depending end of the cores, and is formed with a curved sloping surface 91. The projections 84 are thus configured and located so as to provide the self-aligning feature of the mold box assembly 10 and for casting of the male interlocking elements 202 of the blocks 200 cast therein as will hereinafter be described in detail.

The core die 78 is provided with an oppositely positioned pair of plunger rods 85 (one shown) mounted therein with the rods 85 slidably carried in vertical bores 86 (one shown) within the core. The rods 85 are provided with suitable springs 87 (one shown) so that they are biased toward the open bottom of the mold box die 16. In this manner, the rods 85 will exert a force on the combination pallet die 18 during a casting operation, and will assist in moving the pallet away from the mold box die whan the casting operation is completed. Although not shown, the core die 80 will be understood to be also provided with identical biasing assemblies.

As seen in FIG. 3, the pallet die 18 is a planar structure which is provided with a particular array of dimples or recesses 88 formed therein with those recesses each being configured in an inverted frustoconical shape. The pallet die 18 is of substantially rectangular shape and is specifically sized as to its length and width dimensions so as to substantially match the bottom of the mold box die 16. The pallet die 18 is seen to have six rows of four recesses each, with the spacing between the rows being identical with the spacing between each of the recesses, and the rows being transversely aligned thereon which will position a different pair of those rows below each of the open compartments 61, 62 and 63 of the mold box die 16 when the pallet die is positioned for a block casting operation.

It will now be seen that the blocks 200 cast in the apparatus 10 will have the configuration of the vertical exterior sidewalls determined by the mold box die 16, the configuration of the vertical passages through the block determined by the core die assemblies 70, one horizontal surface determined by the pallet die 18, and the core die assemblies 70 with the other horizontal surface determined by the head die assembly 14 and the core die assemblies 70.

The mold box die assembly 16 further includes three pair of channel dies 90 and 94 with each pair being located in a different one of the compartments 61, 62 and 63 of the mold box die 16. Each of the channel die assemblies 92 and 94 are identical, therefore the following description of the particular channel die 94 which is shown in FIG. 6 as being exploded from the compartment 62 of the mold box die 16, will be understood to also apply to all the other channel dies.

The channel die 94 includes a hanger bracket 95 which consists of a spanner member 96 having a mounting flange 97 on each of its opposite ends. The hanger bracket 95 is adapted for demountable affixation on the opposite end walls 53 and 54 of the mold box die 16, such as with bolts 98, which positions the hanger bracket 95 of the channel die 94 laterally adjacent and parallel with respect to the hanger bracket 72 of the core die assembly 70. The spanner member 96 of the channel die 94 has a plurality of aligningly arranged channel dies 99*a*, 99*b*, 99*c*, 99*d* and 99*e* attached thereto such as by welding so that they are spaced from each other and depend from the spanner member.

When the channel die assembly 94 is mounted on the sidewalls 53 and 54 of the mold box die 16, the channel die 99*a* is spaced inwardly from the wear plate 65 (FIG. 7) so that when the mold box die 16 is filled with cement, that space will fill with cement and form the channel end closing thin-wall skin 224 of the cement block 200 as shown in FIG. 1. The channel die 99*e* is similarly disposed with respect to the wear plate 66 (FIG. 7) to form the channel end closing thin-wall web 222 of the block 200. The spaces between the aligned channel dies 99*a* through 99*e* will also fill with cement during a block casting operation and will thus form the stabilizer thin-wall webs 226 of the block 200.

Figure 8:
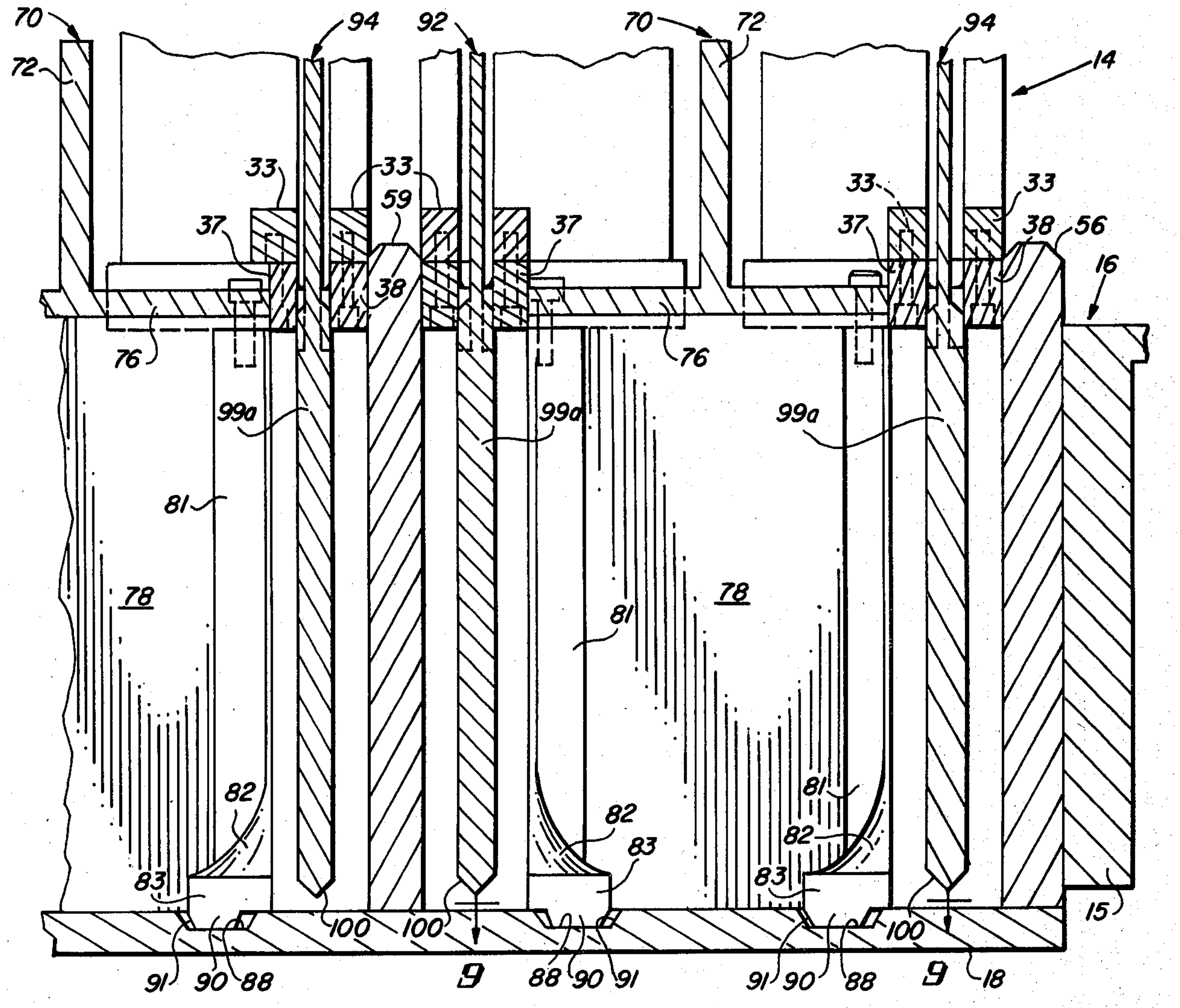
FIG. 8 is a fragmentary vertical sectional view taken through the pallet die, mold box die, and head die assembly in their working positions during casting of the block shown in FIG. 1.
Figure 9:
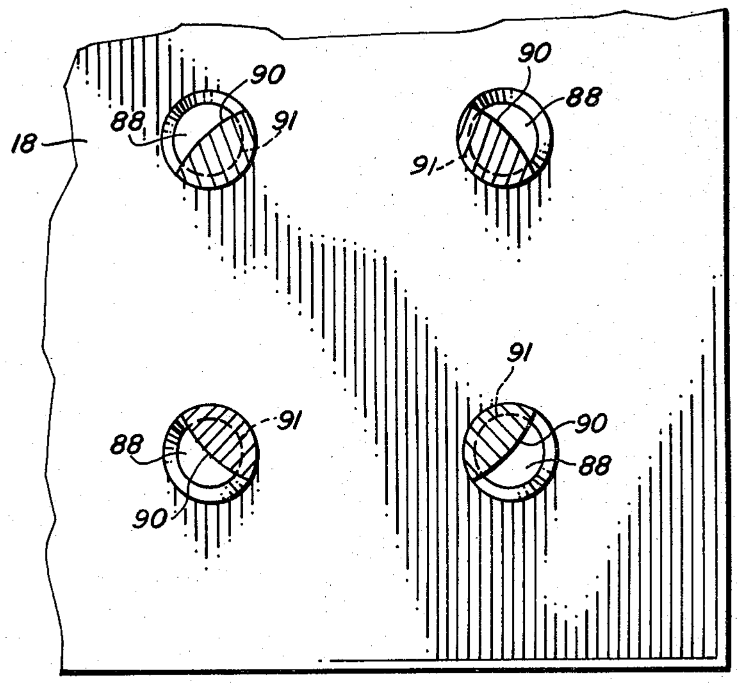
FIG. 9 is a fragmentary sectional view taken along the line 9—9 of FIG. 8.

For a clear understanding of the operation of the mold box apparatus 10 and the resulting configuration of the block 200 cast therein, reference is now made to FIGS. 8 and 9. FIG. 8 shows a fragmentary vertical section of the apparatus 10 in its block casting position. The pallet die 18 is shown as having been raised by elevating device 20 (FIG. 3) into engagement with the bottom edges of the mold box die 16 so that the otherwise open bottom thereof is now closed. Such elevating of the pallet die 18 will result in the projections 84 of the core dies 78 and 80 being received in the recesses 88 of the pallet die which, in the event of misalignment, results in shifting or otherwise moving the pallet die into the properly aligned position. In addition to this self-aligning feature, the projections 84 will partially close their respective ones of the recesses 88 as will hereinafter be described.

Although the cement (not shown) has been omitted from the drawings for clarity, it will be understood that when it is poured into the mold box die 16, by the cement delivery mechanism 12 (FIG. 3), it will flow into all of the open spaces and cavities formed by the mold box die 16 and the pallet die 18. Thus, the cement (not shown) in the open compartment 63 shown in FIG. 8, will be contained within the side wear plates 56, the partition wear plate 59, and the oppositely disposed end wear plates 65 and 66 (FIG. 7) and will completely surround the core 78 (and the core 80 shown in FIG. 6). The cement will flow into the notches 81 and the enlarged cavities 82 of the cores and will flow into the open portions 92 of the recesses 88 of the pallet die 18 as seen in FIG. 9. As shown, the channel die assembly 92 depends into the space between the partition wear plate 59 and the cores 78 (and 80 shown in FIG. 6), and the channel die assembly 94 depends into the space between the side wear plate 56 and the core dies 78 and 80. Thus, cement will completely surround the channel dies **99*a* through 99*e* of the channel die assemblies 92 and 94 thus forming the open top channels 212 and 216 of the block 200 (FIG. 1) and will also form the cementitious thin-wall webs 222, 224 and 226** thereof.

As seen best in FIG. 8, the depending ends 100 of the channel dies **99*a* through 99*e* are wedge shaped and the apexes of these bottom ends are spaced upwardly from the pallet die 18. The wedge shaped lower ends of the channel dies are provided so that the green, i.e., uncured, cast blocks can be moved downwardly relative to the channel dies without destroying the open channels 212 and 216 of the block 200, and the space below the wedge shaped bottoms 100 permits cement flow during a block casting operation for forming the cementitious thin-wall channel bottom closing web 220**.

To complete the block casting operation, the head die assembly 14 is moved downwardly, subsequent to deposition of cement in the mold box die 16, by the vertically reciprocating device 11 (FIG. 3) to the position shown in FIG. 8. In this downwardly moved or working position, the split shoe die assemblies 35 and 36 of the head die assembly 14 will lie atop the cement (not shown) and will transmit compacting and vibrating forces applied thereto by the block making machine in the well known manner. When the vibrating and compacting operations are completed, the head die assembly 14 is raised and the pallet die 18 is lowered, and such lowering of the pallet die 18 will move the cast blocks (not shown) out of the mold box die 16 and they will be carried by the pallet die 18 to a suitable kiln (not shown). The above described cycle is continuous and each new cycle is started when the conveyor 13 brings another pallet die into position below the mold box die 16.

Figure 2:
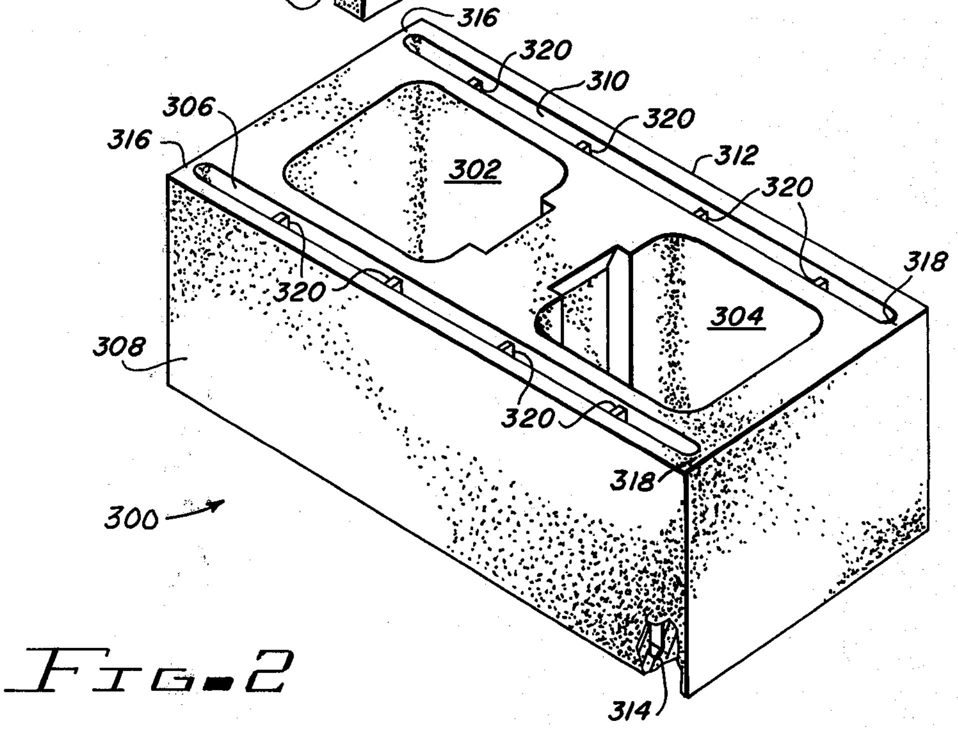
FIG. 2 is a perspective view showing another type of cementitious building block castable in the mold box apparatus of the present invention.

Referring now to FIG. 2 wherein a modified form of thermally insulatable cementitious block 300 is illustrated. The block 300 is of substantially conventional configuration with a spaced pair of vertical passages 302 and 304 extending therethrough. The block 300 is seen to have an open top channel 306 formed in one sidewall, or face 308 thereof and an identical open top channel 310 formed within the opposite sidewall, or face 312 thereof. A comparative examination of FIGS. 1 and 2 will show that the channels 306 and 310 of the block 300 are identical with the channels 212 and 216 of the hereinbefore described block 200. Thus, each of the channels 306 and 310 of the block 300 are cast with a bottom closing thin-wall web 314, opposite end closing thin-wall webs 316 and 318, and incrementally spaced stabilizer thin-wall webs 320.

Figure 10:
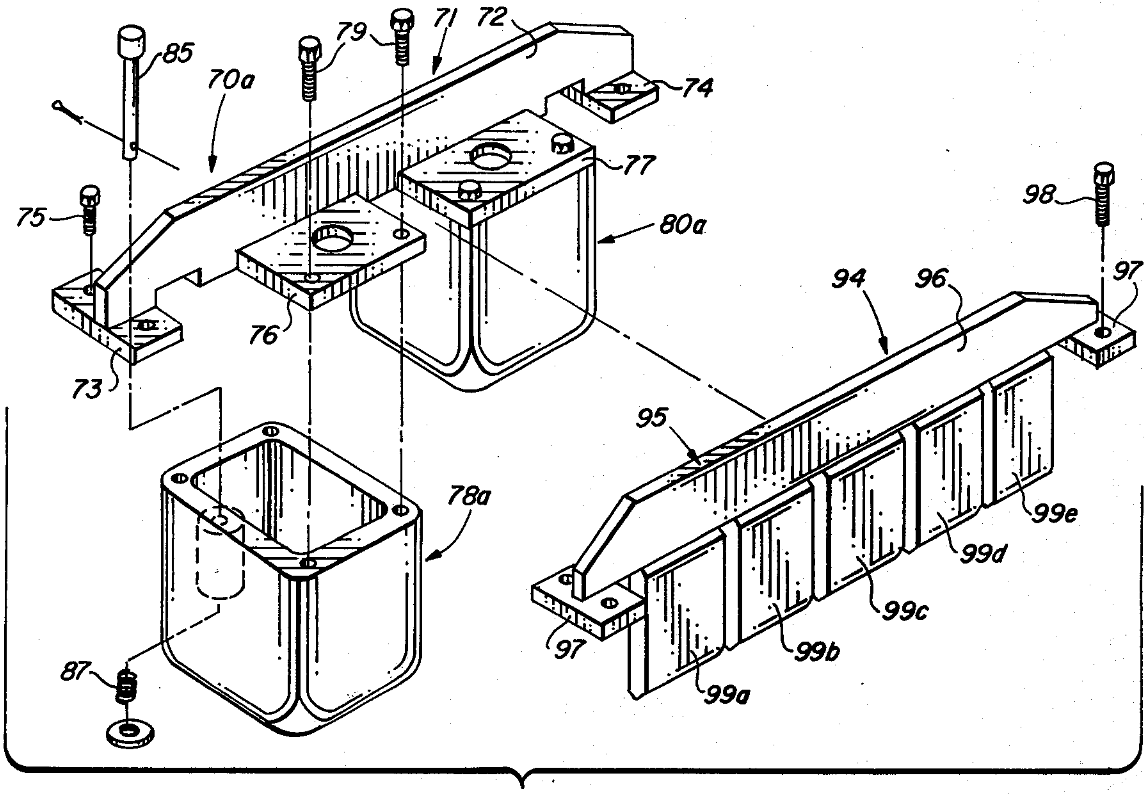
FIG. 10 is a perspective exploded view of a portion of the mold box die which is shown in modified form for casting of the block shown in FIG. 2.
Figure 11:
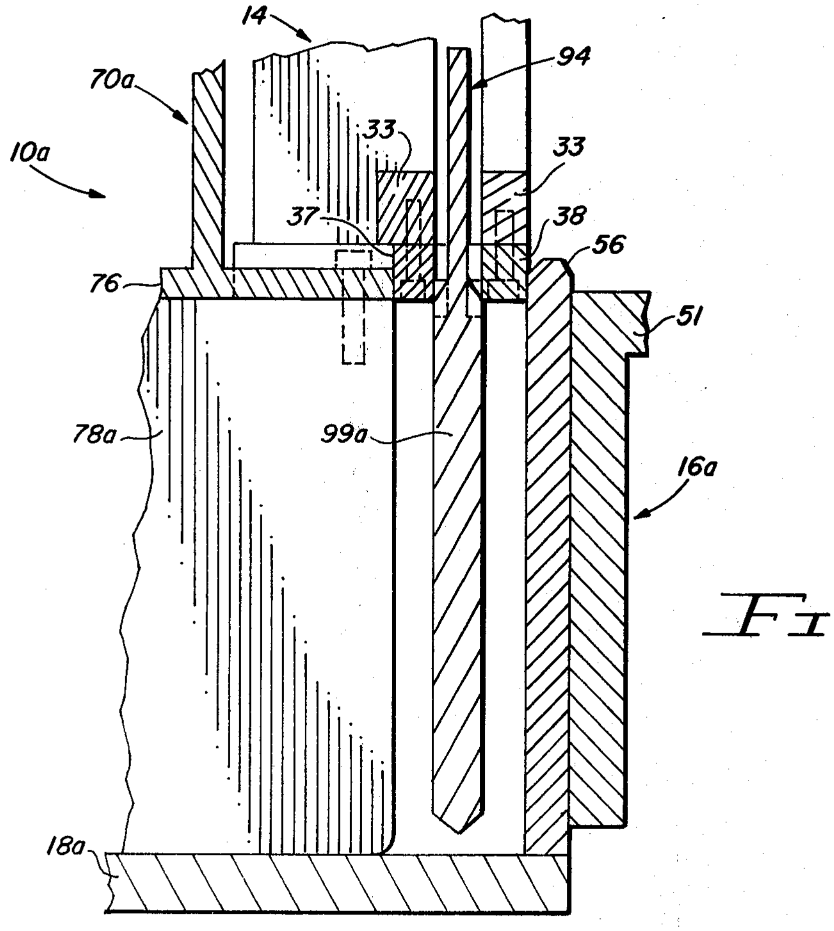
FIG. 11 is a fragmentary vertical sectional view taken through the pallet die, the mold box die, and the head die assembly in their working positions during casting of the block shown in FIG. 2.

The thermally insulatable block 300 is cast in a modified mold box apparatus **10*a* of the present invention which is modified as shown in FIGS. 10 and 11 and as will now be described. The head die assembly 14 is identical with that already described, and a flat planar pallet die 18*a* is employed instead of the recessed pallet die 18** hereinbefore described.

The mold box die **16*a* is equipped with the channel die assemblies 92 and 94 as hereinbefore described, with the channel die assembly 94 being shown in FIG. 10, and the mold box die 16*a* is modified to the extent that the core die assembly 70*a* replaces the hereinbefore described core die assembly 70. The core die assembly 70*a* includes the hanger bracket 71 which consists of the spanner member 72 having the mounting flanges 73 and 74 on the opposite ends thereof. The spanner member has the spaced pair of core mounting pads 76 and 77 affixed thereon and the core dies 78*a* and 80*a* are suspended from the pads 76 and 77. As seen, the core dies 78*a* and 80*a* are of substantially square cross sectional configuration and are flat on their bottom ends for bearing engagement with the top planar surface of the pallet die 18*a* when the apparatus 10*a* is in the block casting position as shown in FIG. 11**.

Therefore, the block 300 (FIG. 2) will be cast in the hereinbefore described manner within the mold box apparatus **10*a* and will thus be provided with open top channels 306 and 310** for subsequent pouring and curing of polyurethane foam therein.

While the principles of the invention have now been made clear in illustrated embodiments, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A mold box apparatus for casting cementitious blocks with a channel in at least one of the sidewalls thereof in which thermally insulative foam is subsequently castable, said mold box apparatus comprising:

(a) a mold box die which is open at the top and bottom and has at least one compartment which forms the side and end walls of the block when cement is deposited therein;

(b) a pallet die positioned in engagement with said mold box die to close the bottom thereof;

(c) a core die assembly mounted on said mold box die so as to span the open top thereof, said core die assembly having a spaced pair of core dies depending therefrom into the compartment of said mold box die to form vertical passages centrally through the block formed upon deposition of cement therein; and (d) at least one channel die assembly mounted on said mold box die so as to span the open top thereof and disposed to be laterally adjacent and parallel with respect to said core die assembly, said channel die assembly having a plurality of aligned channel dies depending therefrom to form a channel within one of the sidewalls of the block when cement is deposited in the compartment of said mold box die, said plurality of channel dies spaced from the mold box die, spaced from the pallet die and spaced from each other so that the channel formed in the block upon deposition of cement into said mold box die has its opposite ends closed by thin-wall cementitious webs, has its bottom closed by a thin-wall cementitious web, and has a plurality of cementitious thin-wall stabilizer webs formed transversely in the channel.

2. A mold box apparatus as claimed in claim 1 and further comprising a second channel die assembly mounted so as to be laterally adjacent the opposite side of said core die assembly to form an identical channel in the opposite sidewall of the block when cement is deposited into said mold box die.

3. A mold box apparatus as claimed in claim 1 and further comprising:

(a) each of the core dies of said core die assembly being of substantially square cross section to form four corners at the upper end thereof and having an inwardly flared cavity formed at each lower corner so that upon deposition of cement into said mold box die the upper horizontal surface of the cementitious block will have a pair of substantially square openings to provide a predetermined array of open corners and the bottom horizontal surface will have a pair of substantially square openings with a corner corbel in each corner thereof with the corner corbels arranged in an identical vertically aligned array with respect to the open corners;

(b) a plurality of projections depending from each of the core dies of said core die assembly with each of said projections located adjacent a different one of the flared cavities formed therein;

(c) said pallet die having a plurality of recesses formed therein with each disposed to receive a different one of said projections therein for precision positioning of said pallet die relative to said mold box die; and (d) said projections each configured to close approximately one half of the recess of said pallet die in which it is received so that upon deposition of cement into said mold box die the cementitious block will be formed with a projection depending from each of the corner corbels formed in the bottom horizontal surface thereof.

4. A mold box apparatus as claimed in claim 3 wherein each of the recesses formed in said pallet die is of inverted frusto-conical configuration.

5. A mold box apparatus as claimed in claim 3 wherein each of said projections which depend from the core dies of said core die assembly is in the form of one half of an inverted vertically bisected frustoconical solid.

6. A mold box apparatus as claimed in claim 3 wherein each of said projections which depend from the core dies of said core die assembly is in the form of one half of an inverted frustoconical solid which is vertically bisected to provide a vertical surface which is flush with the inner surface of the inwardly flared cavity to which it is adjacent.

7. A mold box apparatus as claimed in claim 3 wherein the core dies of said core die assembly are formed with an "L" shaped notch extending along the length of their corner edges to provide precise vertical alignment between the open corners and the projections depending from the cementitious block when cast in said mold box die.

8. A mold box apparatus as claimed in claim 1 wherein said mold box die comprises:

(a) a pair of end walls positioned in opposed spaced relationship with the opposite ends thereof forming aligned pairs of ends;

(b) a pair of sidewall wear plates positioned normally with respect to said pair of end walls and each positioned in engagement with a different aligned pair of ends of said end walls;

(c) a pair of sidewalls each in coextending contiguous engagement with the outwardly facing surface of a different one of said pair of sidewall wear plates;

(d) fastening means for demountably attaching said pair of sidewalls and said pair of side wall wear plates to the aligned pairs of ends of said end walls; and (e) a pair of end wall wear plates each demountably attached in contiguous engagement with the inwardly facing surface of a different one of said pair of end walls.

9. A mold box apparatus as claimed in claim 1 wherein said mold box die comprises:

(a) a pair of end walls positioned in opposed spaced relationship with the opposite ends thereof forming aligned pairs of ends;

(b) a pair of sidewall wear plates positioned normally with respect to said pair of end walls and each positioned in engagement with a different aligned pair of ends of said end wall;

(c) a pair of sidewalls each in coextending contiguous engagement with the outwardly facing surface of a different one of said pair of sidewall wear plates;

(d) fastening means for demountably attaching said pair of sidewalls and said pair of sidewall wear plates to the aligned pairs of ends of said end walls;

(e) a pair of partition wear plates extending between said pair of end walls and demountably attached thereto, said partition wear plates disposed in spaced relationship to provide three equally sized compartments within said mold box die; and (f) three end wall wear plates demountably attached in contiguous engagement with the inwardly facing surface of each of said pair of end walls so that each compartment of said mold box die is provided with an opposed pair of said end wall wear plates.

10. A mold box apparatus as claimed in claim 3 wherein said pallet die is configured and positioned to provide eight recesses in the portions thereof which closes the bottom of the compartment of said mold box die, those eight recesses being arranged in two spaced rows of four spaced recesses each with the spacing between the rows being identical with the spacing between the individual recesses.

11. A mold box apparatus as claimed in claim 1 and further comprising a head die assembly vertically reciprocally movable into and out of the open top of said mold box die to form the top horizontal surface of the cementitious block subsequent to deposition of cement into said mold box die.

* * * * *